INVENTOR
Charles S. Ash
BY
Morgan, Finnegan & Durham
ATTORNEYS

Patented Feb. 29, 1944

2,343,129

UNITED STATES PATENT OFFICE 2,343,129

DUAL WHEELED VEHICLE

Charles S. Ash, Milford, Mich.

Application December 3, 1940, Serial No. 368,301

3 Claims. (Cl. 301—36)

The present invention relates to dual wheeled vehicles and more particularly to a novel and improved automotive road vehicle having sets of dual wheels at the front and rear of the vehicle.

Objects and advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention, and together with the description, serve to explain the principles of the invention.

The present invention has for an object the provision of a novel and improved dual wheeled automotive road vehicle having sets of dual wheels, at the front as well as the rear thereof, certain of the wheels being mounted for dirigible movement, at least some of the wheels being driven, and certain of the wheels being adapted for independent rotation. A further object of the invention is the provision of a novel and improved dual wheeled vehicle in which the individual wheels of the sets of independently rotatable dual wheels are interchangeable with duplicate or substantially identical wheels used in the dual wheel sets which are not independently rotatable. The invention also provides a new and improved form of wheel and wheel mounting so that different types of wheels need not be employed for the independently rotatable and conventional dual wheels of the vehicle.

In the illustrative embodiment of the invention, the front of the vehicle is provided with two sets of dual wheels each of which comprises a pair of independently rotatable wheels coaxially mounted on closely adjacent hub members, and these dual wheels are also mounted for dirigible movement, the hub members serving to hold the wheels in proper spaced axial relation with respect to each other. Each of the wheels comprises a dished portion connecting the tire mounting rim with the hub, and the wheels are secured to the hub members so that they diverge radially outwardly to one edge of their respective rims. At the rear of the vehicle are provided two sets of driven dual wheels, the wheels of each set being held against rotation with respect to each other, and these wheels are substantially identical with the wheel members used at the front of the vehicle. At the rear, a spacing member is provided between the adjacent wheels of each pair, and this spacing member holds the wheels in the same spaced axial relation as do the hub members at the front of the vehicle; the spacing member and the hub portion being adapted to receive the duplicate wheels so that all of the wheels of the entire vehicle are completely interchangeable, and different kinds of spare tires and wheels need not be carried on the vehicle.

It will be understood that the foregoing general description and the following detailed description as well, are exemplary and explanatory of the invention but are not restrictive thereof.

Figure 1:
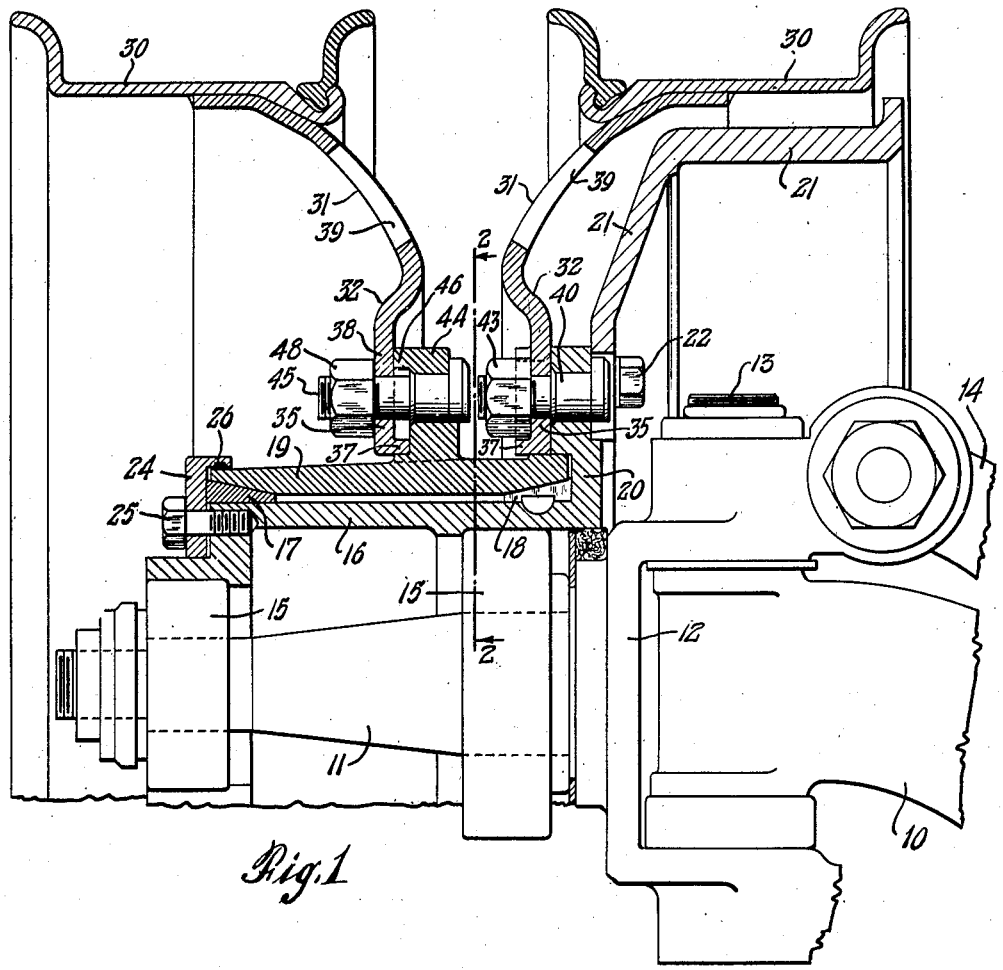
Figure 1 is a fragmentary vertical section showing a pair of independently rotatable dual wheels mounted for dirigible movement at one side of the front of a vehicle.
Figure 2:
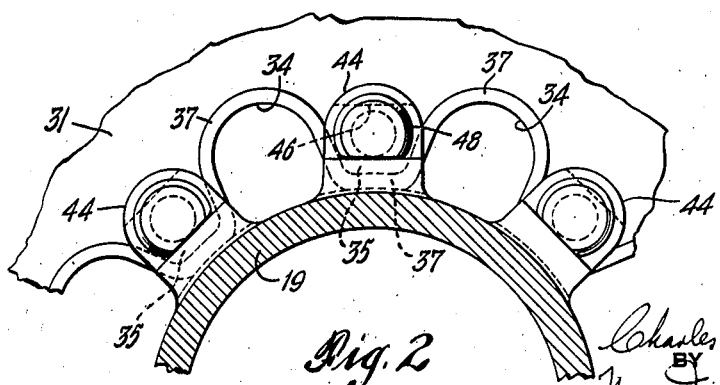
Figure 2 is a fragmentary sectional view taken on the line 2—2 of Figure 1.

Referring now in detail to the illustrative embodiment of the invention as shown in the accompanying drawings, Figures 1 and 2 illustrate a pair of independently rotatable dual wheels and their dirigible mounting as used at the front of a vehicle in accordance with the present invention. As embodied, there is provided an axle 10 at the end of which is a spindle 11 connected by its yoke 12 to be moved about a king pin 13 by means of the steering arm 14 from the steering gear (not shown). Spindle 11 carries anti-friction bearings 15 which rotatably support a hub member 16 and hold it against axial movement with respect to the spindle. The outer surface of the hub member 16 is generally cylindrical and near its ends is provided with tapered bushings 17 and 18 by which a slightly larger generally cylindrical hub member 19 is supported, the tapered bushings 17 and 18 forming the bearing for the correspondingly beveled interior ends of the hub member 19.

Means are preferably provided for braking at least one of each pair of the relatively rotatable wheels at the front of the vehicle, and as illustrated a brake is provided for each of the inner dirigible wheels.

Near its inner end the hub member 16 is formed with a flange portion 20 which extends radially outwardly, and to this flange is secured a brake drum 21 by means of the cap screws 22, the outer face of the radial flange 20 being recessed annularly to receive the bushing 18 and the inner end of the hub member 19, at the same time forming an inner thrust bearing for the end of the hub member 19. At its outer end the hub member 16 is adapted to receive a removable flange 24 which is secured thereto by means of cap screws 25, and is annularly recessed to receive bushing 17 and the outer end of hub member 19, as well as the lubricant retaining packing 26.

On each of the spindles 11 are mounted a pair of pneumatically tired wheels, illustratively shown as demountable wheels permanently attached to their rims, and these wheels are duplicates of or substantially identical with the wheels used at the rear for the driving of the vehicle. As embodied, each of the rims 30, of conventional construction, is permanently attached to a demountable wheel body 31 which is rather deeply dished and extends from a point closely adjacent to the center of the rim to one side edge thereof and thence radially inwardly, being slightly reversely dished, as at 32. At its inner edge, the wheel body 31 is formed with a plurality of short radially extending rounded slots 34 which provide short spokes or lug portions 35 between them. This inner edge of the wheel is preferably bent, as at 37, to provide a strengthening rib and a face by which the wheel may be seated on its hub, but aside from this edge 37, the central portion 38 of the wheel is preferably finished to provide parallel surfaces at the spokes 35. In order to lighten the wheel, to deaden its sound and to provide for the circulation of air, the wheel body 31 is formed with a plurality of apertures 39 uniformly spaced circumferentially of the wheel.

The inner wheel of the pair of dirigible wheels which are independently rotatable is preferably mounted on the outer face of the brake supporting flange 20 by means of the wheel mounting bolts 40 which pass through the flange to enter corresponding apertures in the spoke portions 35 of the wheel, and the outer face of the flange 20 is flat to insure full, even contact with the inner face of the spoke portion 35, while the wheel is firmly secured by means of the nuts 43 which are received within the rib 37.

The outer wheel of the dirigible pair is mounted on its hub portion 19 by means of radially extending short spoke members 44 which are apertured to receive the wheel mounting bolts 45, and are also provided with outwardly extending portions 46 which extend for a distance equal to the inward extension of the ribs 37. The outer wheel securing nuts 48 draw the wheel tightly against the spokes 44, seating the rib 37 against the outer face of the spokes 44 and seating the outer face of portions 46 against the inner face of the spoke portions 35. The scalloped slots 34 are preferably slightly larger than the spoke extensions 44 so that the inner wheel may be slipped over the spokes 44 of the outer hub, and when the two wheels are in the position shown in Figure 1, they are securely held in proper spaced axial relation with their wheel bodies diverging radially to provide the proper spacing of the tires.

Figure 3:
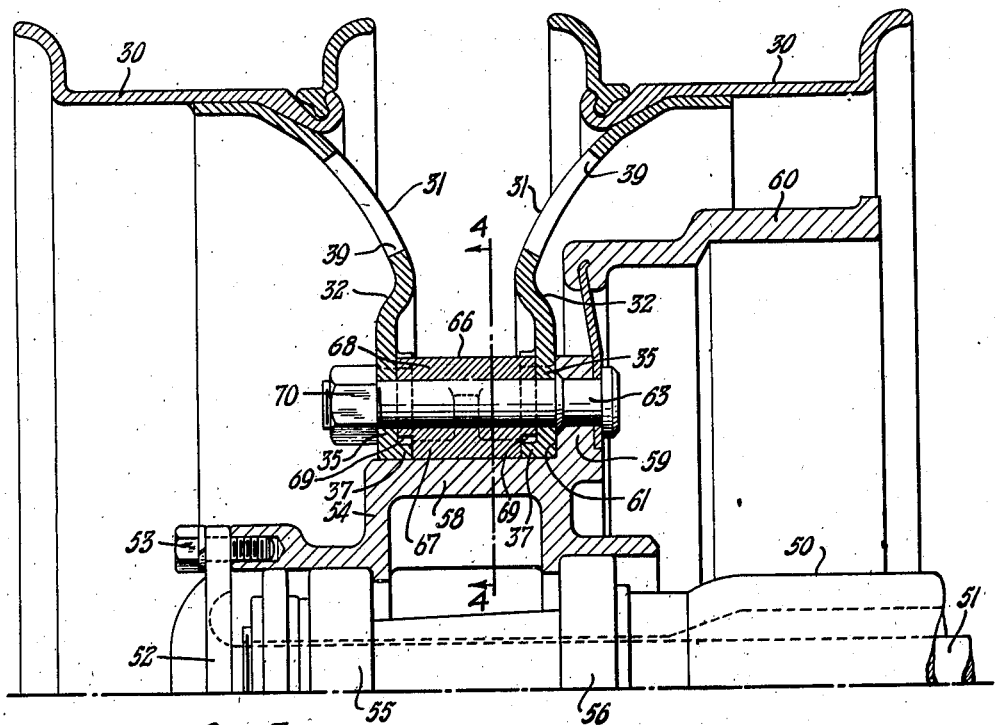
Figure 3 is a fragmentary vertical sectional view showing a pair of driven dual wheels at one side of the rear of the vehicle by which the vehicle is adapted to be driven.
Figure 4:
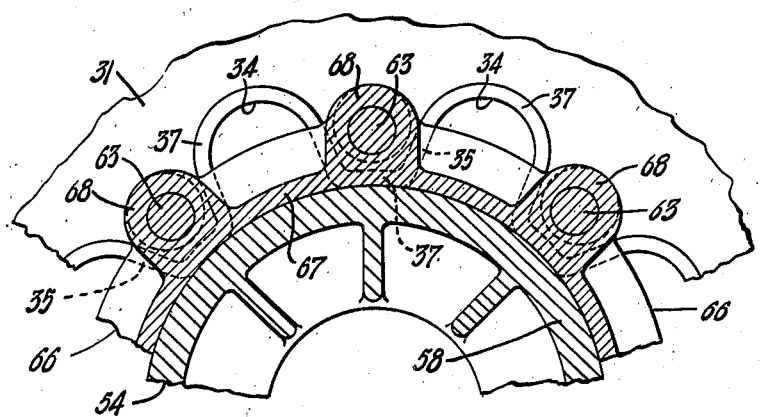
Figure 4 is a fragmentary sectional view taken on the line 4—4 of Figure 3.

Figures 3 and 4 illustrate a form of dual wheeled rear axle according to the present invention which is adapted to receive and hold wheels identical to the front wheels in the same spaced apart relation as on the front axle, but with the wheels held against relative rotation, as with conventional dual wheels. As illustrated, the rear axle comprises an axle tube 50 within which is the drive shaft 51 terminating in a driving flange 52 fast to the outer end of wheel hub 54 by means of the cap screws 53. The wheel hub 54 is mounted for rotation, as in a full floating axle, by means of the anti-friction bearings 55 and 56, which also serve to hold the wheel hub against axial movement with respect to the axle shaft 51 and tube 50.

Wheel hub 54 extends inwardly to provide a cylindrical portion 58, and near its inner end is provided with a radially extending flange 59 on which the brake drum 60 is mounted, while the outer side of the flange 59 is faced to provide a radial annular surface 61 against which the flat surface of the spokes 35 of the inner wheel may be seated, wheel securing bolts 63 also being provided to pass through the apertures of the spokes.

For spacing the driving wheels (which are not relatively rotatable) the same distance from each other as the independently rotatable dirigible wheels are spaced, a spacing ring 66 is provided. This comprises a ring portion 67 provided with radially extending bosses 68 which are apertured to pass over the mounting bolts 63, and these bosses are cut away on both faces to be received within the recess provided by the curving rib 37 at the inner edge of the wheels. Thus, the cutaway shoulder portion 69 allows the face of rib 37 to seat against the spacing ring 66, 67, while the face of the bosses 68 is seated against the radially extending portion of the wheel spokes 35. The wheels are firmly held in proper spaced axial relation by means of the wheel mounting nuts 70 on the outer ends of bolts 63, while the cylindrical portion 58 of hub 54 supports the wheels in the proper coaxial relation.

It will thus be seen that the rear wheels diverge outwardly and are held in the same axially spaced relation as the independently rotatable front wheels, and only a single type and size of tire rim and wheel is needed to replace any of the wheels of the vehicle. Thereby is avoided the necessity which has heretofore existed of carrying more than one type of a spare wheel and tire where certain of the dual wheels of a vehicle are independently rotatable and others are not independently rotatable.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel having a demountable disked wheel web extending inwardly from a tire mounting rim, said wheel web having a central scalloped portion, the edge of which is bent to form a rib which is surfaced to lie in a radial plane, a rotatable wheel hub having short spoke-like members projecting radially therefrom to be connected to the scalloped portion of the wheel web, each of said spoke-like members having two radial surfaces and engageable with the surfaced rib portion and another portion of the wheel web.

2. A vehicle wheel having a demountable disked wheel web extending inwardly from a tire mounting rim, said wheel web having a central scalloped portion, the edge of which is bent to form ribs with the rib surfaces lying in a radial plane and the sides of the scalloped portion opposite the rib surfaces lying in another radial plane, a rotatable wheel hub having short spoke-like radially projecting members to be connected to the scalloped portion of the wheel web, each of said spoke-like members having portions lying in two radial planes and engageable with the surfaced ribs and adjacent portions of the wheel web.

3. In a dual wheel structure, the combination of a pair of coaxial independently rotatable hubs each having a plurality of wheel mounting bolts extending axially therefrom and arranged in circular series, one of the hubs being formed with radially extending spoke-like members, and the other being provided with a radially surfaced member in which the wheel mounting bolts are mounted, a pair of dished duplicate wheels having their dished portions adjacent to each other, each of said wheels having a centrally scalloped portion apertured to fit over the mounting bolts, the inner edge of the scalloped portion of each wheel being bent over to form narrow ribs on one side and a radial surface on the other side of the scalloped edge, the spoke-like members of one hub having portions to fit against the rib surface and scalloped portion of one wheel, while the radial surface of the member on the other hub is adapted to fit against the radial surface of the scalloped edge of the other wheel.

CHARLES S. ASH.